(12) United States Patent
Hoffmann (10) Patent No.: US 10,500,984 B2
(45) Date of Patent: Dec. 10, 2019

(54) REDUCTION GEAR AND GEAR MOTOR (71) Applicant: Adient Luxembourg Holding S.à.r.l., Luxembourg (LU)

(72) Inventor: Andreas Hoffmann, Wuelfrath (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 192 days.

(21) Appl. No.: 15/742,703

(22) PCT Filed: Jul. 1, 2016

(86) PCT No.: PCT/EP2016/065555
§ 371 (c)(1),
(2) Date: Jan. 8, 2018

(87) PCT Pub. No.: WO2017/005641
PCT Pub. Date: Jan. 12, 2017

(65) Prior Publication Data
US 2018/0201158 A1   Jul. 19, 2018

(30) Foreign Application Priority Data
Jul. 9, 2015   (DE) .......................... 10 2015 212 823

(51) Int. Cl.
*B60N 2/02*  (2006.01)
*F16H 1/32*  (2006.01)
(Continued)

(52) U.S. Cl.
CPC ........... *B60N 2/0232* (2013.01); *B60N 2/165* (2013.01); *B60N 2/166* (2013.01); *F16H 1/16* (2013.01);
(Continued)

(58) Field of Classification Search
CPC ...... H02K 7/081; H02K 7/116; H02K 7/1166; H02K 51/00; F16H 1/16; F16H 1/32;
(Continued)

(56) References Cited

U.S. PATENT DOCUMENTS 4,884,844 A * 12/1989 Kershaw ............. B60N 2/2252
297/362
5,716,202 A   2/1998 Koyama et al.
(Continued)

FOREIGN PATENT DOCUMENTS

DE   10 2004 043 310 B4   8/2009
EP   0 143 526 A2   6/1985

*Primary Examiner* — Michael Andrews
*Assistant Examiner* — Minki Chang
(74) *Attorney, Agent, or Firm* — McGlew and Tuttle, P.C.

(57) ABSTRACT

A reduction gear includes a housing (210) and gear stages with an externally toothed first gear wheel (240), and an internally toothed second gear wheel (260), meshing with the first gear wheel, and rotationally fixed to an output (270). The first gear wheel is moved circularly by an eccentric (226). A torque support disc prevents the first gear wheel rotating relative to the housing. The first gear wheel has a guide pin which engages in a guide groove of the torque support disc, or the torque support disc has a guide pin, which engages in a guide groove of the first gear wheel. The first gear wheel has a base body with a cam or the torque support disc has a base part with a cam which projects in the axial direction and contacts the torque support disc whereby the guide pin does not completely engage in the guide groove.

20 Claims, 4 Drawing Sheets

(51) Int. Cl.
*B60N 2/16* (2006.01)
*F16H 1/16* (2006.01)
*H02K 7/116* (2006.01)

(52) U.S. Cl.
CPC .... *B60N 2002/0236* (2013.01); *H02K 7/1166* (2013.01)

(58) Field of Classification Search
CPC ............... F16H 3/727; F16H 57/021; F16H 2057/02034; Y10T 74/19828; Y10T 74/2186
USPC .......... 310/83, 99; 74/425, 425.5, 426, 427, 74/458, 606 A, 606 R, 607
See application file for complete search history.

(56) References Cited

U.S. PATENT DOCUMENTS

| | | | |
|---|---|---|---|
| 5,820,504 A * | 10/1998 | Geralde | F16H 1/32 475/177 |
| 6,106,252 A | 8/2000 | Yamanaka et al. | |
| 9,011,120 B2 | 4/2015 | Adachi et al. | |
| 2008/0050260 A1 | 2/2008 | Iwanami et al. | |
| 2010/0050122 A1 | 2/2010 | Nakajima | |

\* cited by examiner

REDUCTION GEAR AND GEAR MOTOR

CROSS REFERENCE TO RELATED APPLICATIONS

This application is a United States National Phase Application of International Application PCT/EP2016/065555, filed Jul. 1, 2016, and claims the benefit of priority under 35 U.S.C. § 119 of German Application 10 2015 212 823.7, filed Jul. 9, 2015, the entire contents of which are incorporated herein by reference.

FIELD OF THE INVENTION

The invention relates to a reduction gear unit having a housing, a first gear stage and a second gear stage, the second gear stage having an externally toothed first gearwheel and an internally toothed second gearwheel which meshes with the first gearwheel and is at least indirectly connected fixedly to an output so as to rotate with it, and a circulating eccentric which is driven by the first gear stage for driving a relative rolling movement of the second gearwheel on the first gearwheel, the first gearwheel being moved by the eccentric on a circular path, and a torque support disk which is arranged axially next to the first gearwheel and prevents the first gearwheel from performing a relative rotation with respect to the housing, the first gearwheel having at least one guide pin which engages into a guide groove of the torque support disk, or the torque support disk having at least one guide pin which engages into a guide groove of the first gearwheel. In addition, the invention relates to a geared motor.

BACKGROUND OF THE INVENTION

A reduction gear unit of the generic type is known from the prior art as a result of the use in a motor vehicle seat for driving a height setting apparatus. A first gearwheel of a second gear stage has two guide pins which engage into two guide grooves of a torque support disk. The width of the guide pins corresponds approximately to the width of the guide grooves. A relative rotation between the torque support disk and the first gearwheel is avoided as a result. However, the guide pins are arranged in the guide grooves such that they can be displaced linearly. The guide pins are in each case cuboid and are formed in one piece from a main body of the first gearwheel, in particular are pushed through out of the material of the first gearwheel. For manufacturing reasons, a transition region between in each case one guide pin and the main body has to be rounded circumferentially with a radius. As a consequence of the radius, the guide pins can jam with boundary edges of the guide grooves.

A reduction gear unit having an additional third gear stage is known from DE 10 2004 043 310 B4.

SUMMARY OF THE INVENTION

The invention is based on a problem of improving a reduction gear unit of the type mentioned at the outset, in particular of avoiding jamming between the guide pins and the guide grooves on account of rounded transition regions between guide pins and a main body of a gearwheel, and of providing a corresponding vehicle seat.

Jamming between the at least one guide pin and the guide groove is avoided effectively by virtue of the fact that the first gearwheel has at least one cam which projects in the axial direction from a main body of the first gearwheel and bears against the torque support disk in such a way that the at least one guide pin does not engage completely into the guide groove, or that the torque support disk has at least one cam which projects in the axial direction from a main part of the torque support disk and bears against the first gearwheel in such a way that the at least one guide pin does not engage completely into the guide groove. The dimensions of the at least one guide pin and the guide groove can be designed in such a way that a linear guide with full surface area contact and without or with only a small amount of play is provided.

The positive effect of the invention is independent of whether the at least one guide pin is configured on the gearwheel and the guide groove is configured on the torque support disk, or vice versa. In addition, the inventive teaching is independent of whether the at least one cam is configured on the gearwheel or on the torque support disk.

A guide pin is to be understood to mean any projection which is suitable to interact with a groove as a linear guide. A basic shape of the guide pin can be, for example, cube-shaped, cuboid or cylindrical. A guide pin can have, for example, a round or oval or angular, in particular rectangular, or polygonal cross section. A guide groove is to be understood to mean any opening or depression which is suitable to interact with a corresponding element, in particular a guide pin, as a linear guide. A cam is to be understood to mean any form of an elevation which projects beyond an adjacent region.

The torque support disk is preferably guided in the housing such that it can be moved linearly in a first direction, and the first gearwheel is guided in the torque support disk such that it can be moved linearly in a second direction. The at least one guide groove in the torque support disk runs in the second direction. The second direction is advantageously oriented perpendicularly with respect to the first direction. On account of the two directions which are arranged perpendicularly with respect to one another, two linear guides are provided which permit a movement of the first gearwheel in all directions of a plane which is arranged perpendicularly with respect to the rotational axis. The movement is limited to a tumbling movement by way of an eccentric.

A first gearwheel with precisely two guide pins and a torque support disk with precisely two guide grooves which are flush with one another or one continuous guide groove are particularly suitable. Two grooves which are parallel but offset with respect to one another are also possible.

The first gearwheel can have a plurality of cams, preferably at least three. As an alternative, the torque support disk can have a plurality of cams, preferably at least three. Three cams provide a statically defined supporting action between the first gearwheel and the torque support disk.

One advantageous arrangement of the cams can be achieved by the first gearwheel or the torque support disk having precisely four cams which are arranged, in particular, in a mirror-symmetrical manner with respect to one another.

A plurality of cams are preferably arranged such that they are distributed uniformly with respect to one another. It is particularly preferred here that two guide pins are arranged on a line which is congruent with the second direction, and a plurality of cams are arranged in a mirror-symmetrical manner with respect to the line.

The height of the at least one cam is preferably greater than a radius of the transition region between the at least one guide pin and the main body of the first gearwheel. This ensures that the transition region of the at least one guide pin cannot collide with edges of the associated guide groove, which would lead to jamming between the first gearwheel and the torque support disk. In the alternative embodiment, in which the guide pins are configured on the torque support disk, the height of the at least one cam should be greater than a radius of a rounded portion of a transition region between the at least one guide pin and the main part of the torque support disk.

By the at least one cam being connected in one piece to the first gearwheel or in one piece to the torque support disk, the number of components can be kept low. The at least one cam is preferably pushed through. The at least one cam can be a pushed-through portion from a main body of the first gearwheel. The at least one cam can be a pushed-through portion from the main part of the torque support disk. All known forming processes are fundamentally suitable for producing the cams. However, the at least one cam can also be connected in an integrally joined manner to the first gearwheel or the torque support disk, for example by way of welding. The at least one cam can also be connected in a positively locking manner to the first gearwheel or the torque support disk, for example by means of a clipped connection. The at least one cam can also be connected in a non-positive manner to the first gearwheel or the torque support disk, for example by means of a press joint or a shrink joint. The at least one cam can also be a rolling body which is mounted in a depression of the first gearwheel and/or in a depression of the torque support disk.

The first gearwheel and/or the torque support disk can be manufactured from metal, preferably from steel. The torque support disk, or at least a main part of the torque support disk, is preferably a flat, disk-shaped component.

In summary, at least three cams which are configured as pushed-through portions are distributed uniformly on the first gearwheel, in order to prevent a torque support disk which is configured as a guide disk from resting on the radius of guide pins of an externally toothed disk (first gearwheel), which cams serve as defined bearing faces with respect to the guide disk. As a result, a defined position of the guide disk and the externally toothed disk with respect to one another is ensured, and tilting or interlocking of said parts during a relative movement with respect to one another is ruled out. The cams have a minimum height which corresponds to the maximum radius of the transition regions between the guide pins and the first gearwheel.

A geared motor having an electric motor and a reduction gear unit according to the invention is preferably distinguished by the fact that a first gear stage has a worm, which is connected fixedly to a motor output shaft so as to rotate with it, and a worm gear, an eccentric being connected fixedly to the worm gear, in particular. A geared motor of this type can be used, for example, as a drive of a height setting apparatus for a vehicle seat.

Before refinements of the invention are described in greater detail in the following text using drawings, it is to be noted first of all that the invention is not restricted to the described components or the described method steps. Furthermore, the terminology which is used is also not of restrictive nature, but rather merely has an exemplary character. If the singular is used in the following text in the description and the claims, in each case the plural is also included here if the context does not rule this out explicitly.

In the following text, the invention will be described in greater detail using one advantageous exemplary embodiment which is shown in the figures. The invention is not restricted to said exemplary embodiment, however. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, in the following text, a geared motor 100 which is known from the prior art having an electric motor 110 and a reduction gear unit 200 will be described using FIGS. 1 to 6.

The reduction gear unit 200 is arranged virtually completely in a housing 210. The housing 210 is largely closed by way of a housing cover 212. The gear unit cover 212 has a circular cover opening 214 which is flush with a housing opening 216 in the housing 210. The gear unit cover 212 is screwed to the housing 210 by means of a plurality of bolts 218. The housing 210 is connected to the electric motor 110.

Figure 1:
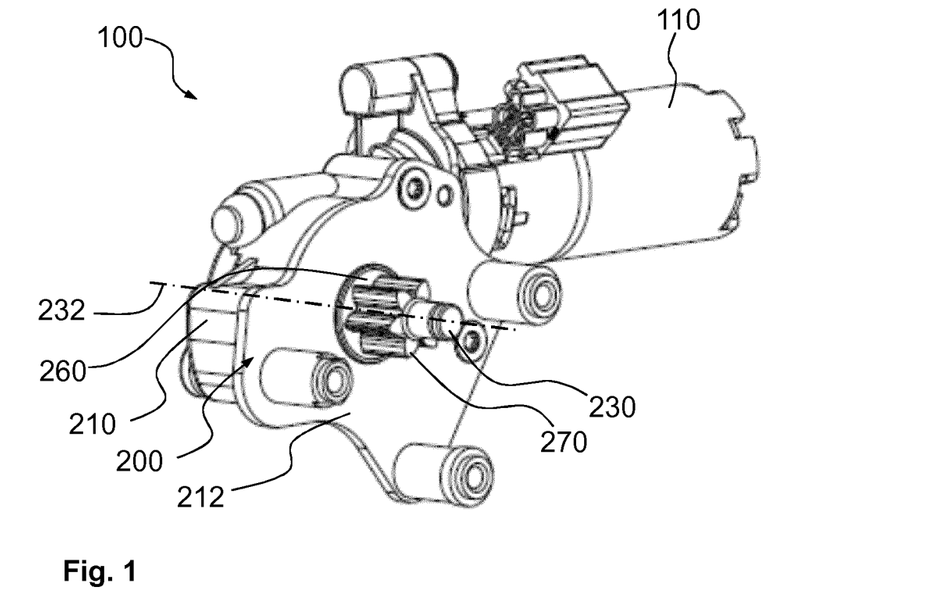
FIG. 1 is a perspective illustration of a geared motor which is known from the prior art having an electric motor and a reduction gear unit.
Figure 2:
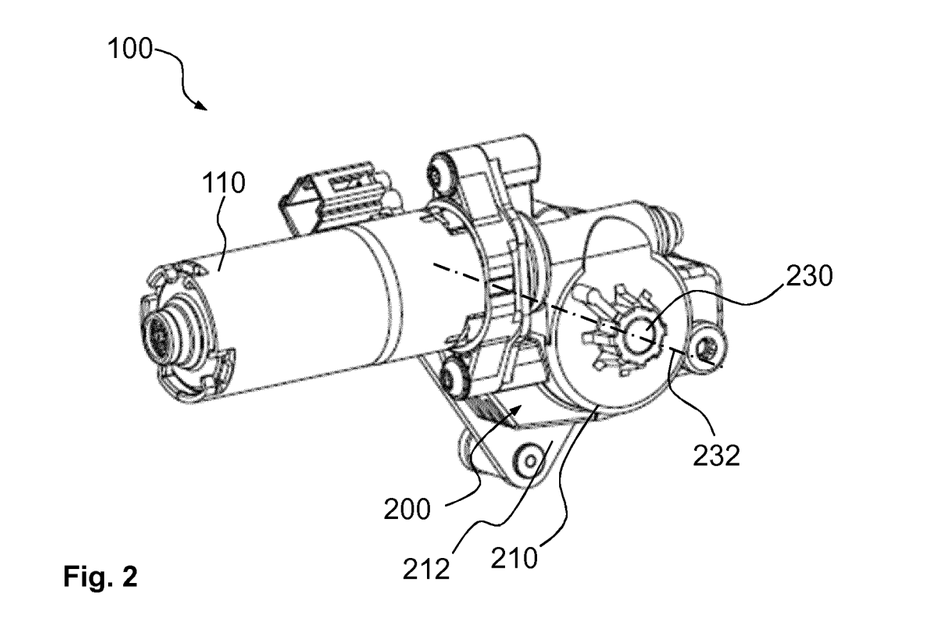
FIG. 2 is a further perspective view of the geared motor from FIG. 1, in a viewing direction which is opposed to that of FIG. 1.
Figure 3:
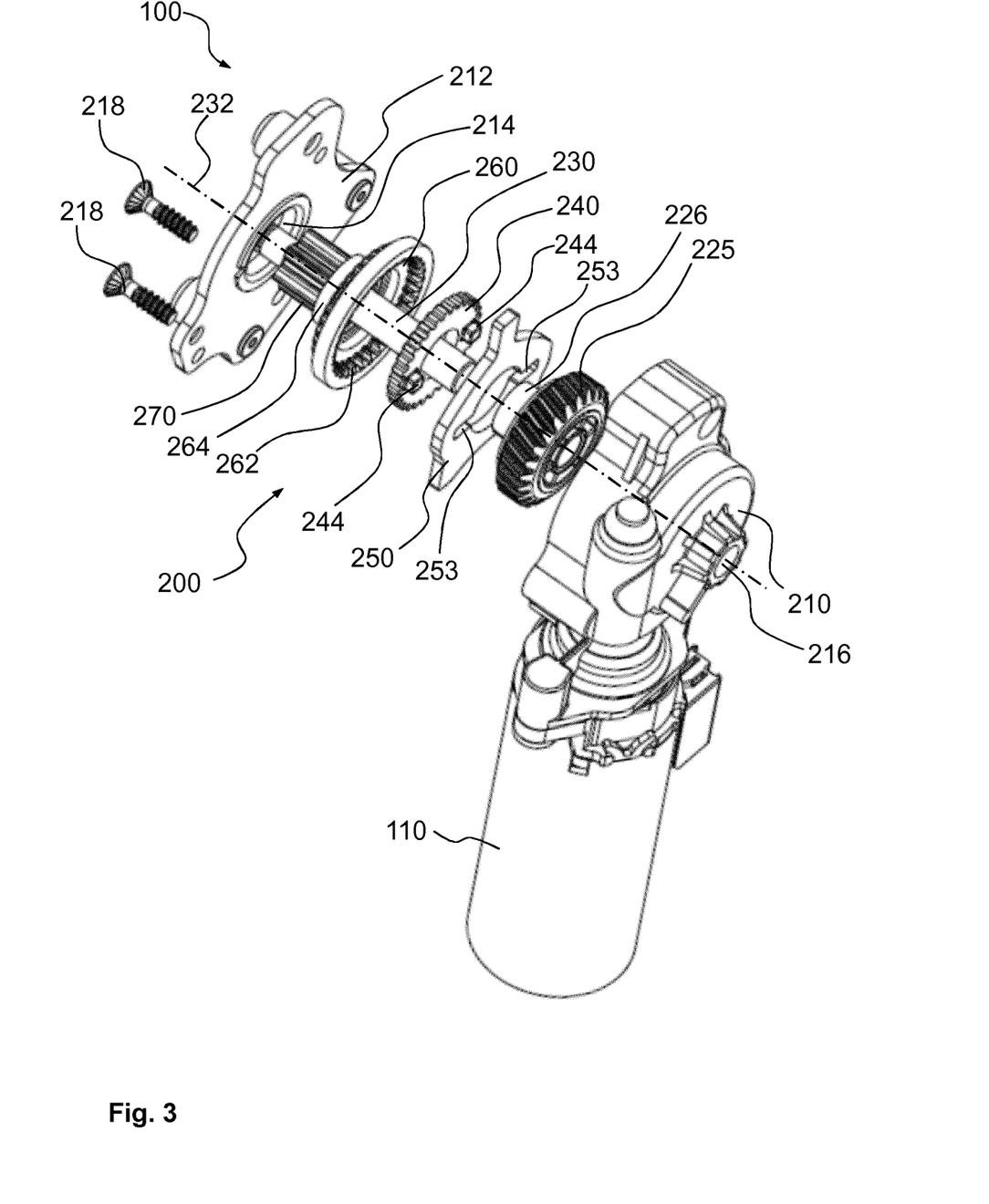
FIG. 3 is an exploded illustration of the geared motor from FIG. 1.
Figure 4:
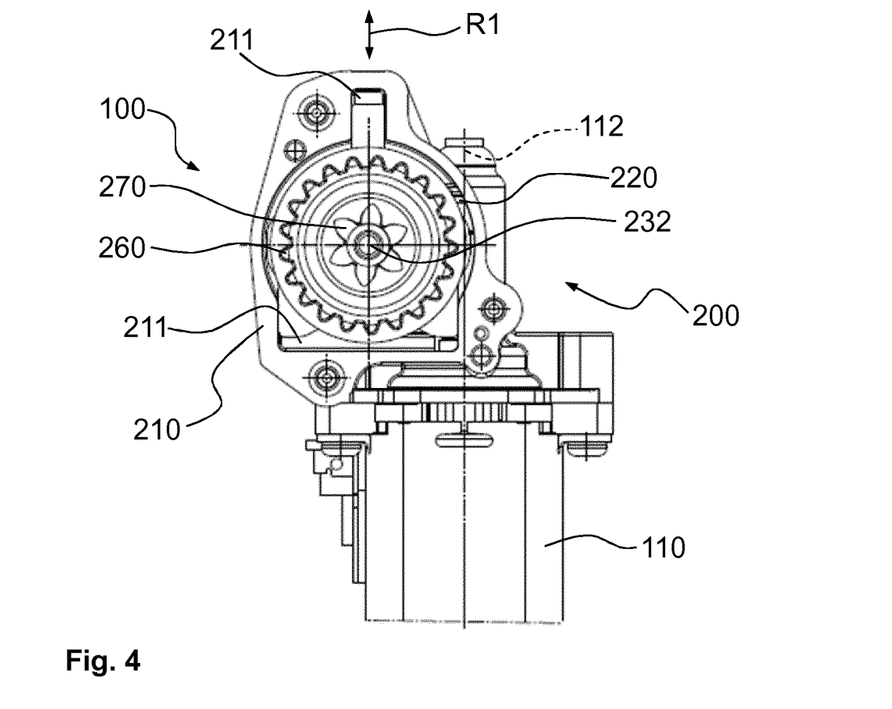
FIG. 4 is a plan view of the geared motor from FIG. 1 without a housing cover.

The electric motor 110 has a motor output shaft 112 which cannot be seen in the figures because part of it is arranged within the electric motor 110 and part of it is arranged within the housing 210. In FIG. 4, the motor output shaft 112 is indicated by way of a dash-dotted line. The motor output shaft 112 protrudes into the housing 210 of the reduction gear unit 200. A helical worm 220 of a first gear stage of the reduction gear unit 200 is arranged at an end of the motor output shaft 112 which faces away from the electric motor 110, and said worm 220 is connected fixedly to the motor output shaft 112 so as to rotate with it. The worm 220 therefore rotates at the rotational speed of the electric motor 110 in the case of actuation of the latter. The motor output shaft 112 of the electric motor 110 at the same time acts as a gear unit input shaft of the reduction gear unit 200.

In the present case, a worm gear 225 is mounted rotatably on an output shaft 230. One end of the output shaft 230 is mounted rotatably in the housing opening 216 of the housing 210. The output shaft 230 is arranged at an angle of 90° with respect to the motor output shaft 112.

The worm 220 and the worm gear 225 form the first gear stage of the reduction gear unit 200. The worm gear 225 has an eccentric 226. The eccentric 226 has a largely hollow-cylindrical form, an inner, cylindrical opening being aligned with a rotational axis 232 of the output shaft 230. The terms "radial" and "axial" which are used are in relation to the rotational axis 232. A cylindrical, outer circumferential face of the eccentric 226 is arranged offset with respect to the rotational axis 232 by an eccentricity, for example from 1.2 mm to 1.3 mm. A center axis of the outer circumferential face of the eccentric 226 runs parallel to the rotational axis 232, but offset radially by the eccentricity. On account of the mounting of the worm gear 225 on the output shaft 230, a rotation of the worm gear 225 brings about an outer circumferential face of the eccentric 226, which outer circumferential face tumbles about the rotational axis 232.

Figure 6:
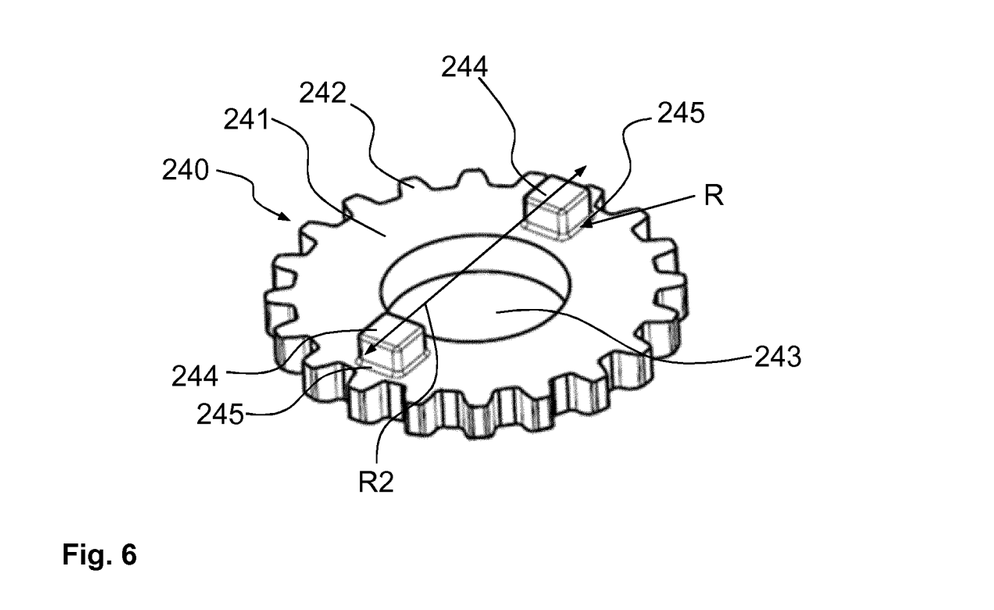
FIG. 6 is a perspective view of a first gearwheel of a second gear stage of the reduction gear unit of the geared motor from FIG. 1.

A first gearwheel 240 has a disk-shaped main body 241 which supports an external toothing system 242 on its outer circumference. The main body 241 has a bearing opening 243 which serves to mount the first gearwheel 240 on the eccentric 226 of the worm gear 225, preferably with a bearing bush being connected in between. Two guide pins 244 project in the axial direction from the main body 241 of the first gearwheel 240. The two guide pins 244 are formed, preferably pushed through, from the main body 241 in each case in a cuboid-shaped manner, in the present case in a cube-shaped manner, and in one piece. For manufacturing reasons, in each case one transition region 245 between the main body 241 and the respective guide pin 244 is rounded circumferentially with a radius R. The two guide pins 244 lie diametrically opposite one another, in relation to a center point of the circular bearing opening 243.

Figure 5:
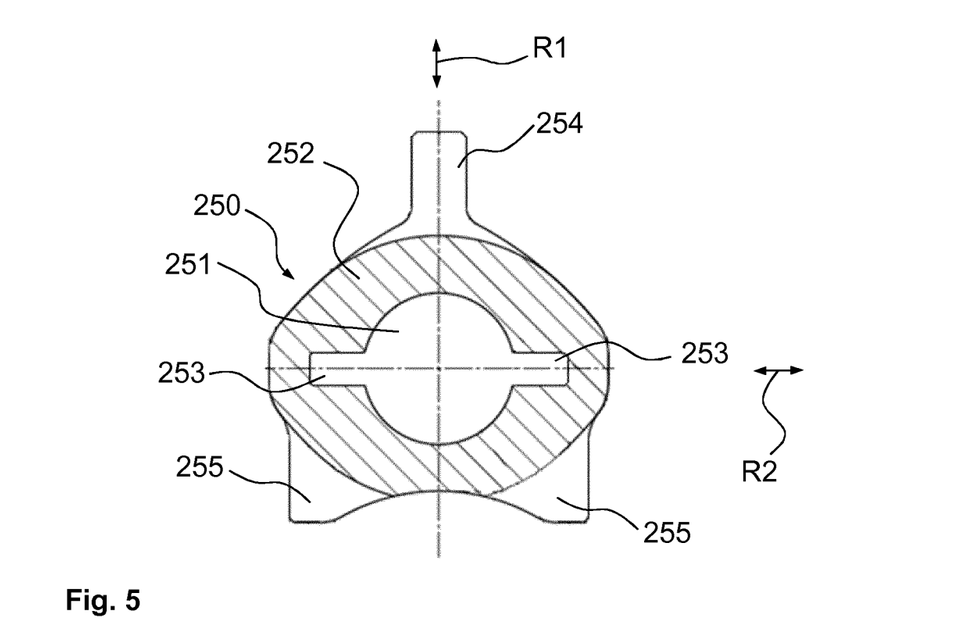
FIG. 5 is a plan view of a torque support disk of the reduction gear unit of the geared motor from FIG. 1.

As viewed in the axial direction, a torque support disk 250 is arranged between the worm gear 225 and the first gearwheel 240. The torque support disk 250 is also called a guide disk. The torque support disk 250 is a largely planar, plate-shaped component of mirror-symmetrical design which has a through opening 251 centrally with respect to a mirror axis, the internal diameter of which through opening 251 is greater than the sum of the external diameter of the eccentric 226 and the eccentricity of the eccentric 226. The eccentric 226 penetrates the through opening 251 in the direction of the first gearwheel 240. The torque support disk 250 prevents the first gearwheel 240 from performing a relative rotation with respect to the housing 210. At the same time, however, the torque support disk 250 makes a circumferential tumbling movement, caused by the eccentric 226, of the first gearwheel 240 possible during a rotational movement of the worm gear 225. To this end, the torque support disk 250 has two guide grooves 253 which are arranged so as to lie diametrically opposite one another. Starting from the through opening 251, the guide grooves 253 run in the radial direction to the outside and serve to receive the two guide pins 244 of the first gearwheel 240. The length of the guide grooves 253 is selected in such a way that the above-described tumbling movement of the first gearwheel 240 is possible on account of a linear relative movability between the guide grooves 253 and the guide pins 244.

In addition, the torque support disk 250 has a first guide lug 254 which projects in the radial direction from the main part 252, and two second guide lugs 255. The two second guide lugs 255 run parallel to one another and receive the mirror axis of the torque support disk 250 centrally between them. By means of the first guide lug 254 and the two second guide lugs 245, the torque support disk 250 is guided in a linearly movable manner in corresponding recesses 211 in the housing 210, to be precise in a first direction R1. The first direction R1 runs perpendicularly with respect to a second direction R2 which results from the relative movability between the guide grooves 253 of the torque support disk 250 and the guide pins 244 of the first gearwheel 240. On account of the above-described linear guide between the housing 210 and the torque support disk 250 in the first direction R1 and the above-described linear guide between the first gearwheel 240 and the torque support disk 250 in the second direction R2, the first gearwheel 240 can tumble relative to the housing 210 with the eccentricity of the eccentric 226, without in the process rotating relative to the housing 210.

The external toothing system 242 of the first gearwheel 240 is in permanent tooth engagement with an internal toothing system 262 of a second gearwheel 260 which is connected fixedly to the output shaft 230 so as to rotate with it. The first gearwheel 240 and the second gearwheel 260 form a second gear stage of the reduction gear unit 200. The internal toothing system 262 has at least one tooth more than the external toothing system 242. As a result, the tumbling movement of the first gearwheel 240 produces a rotational movement of the second gearwheel 260 about the rotational axis 232.

On that side of the second gearwheel 260 which faces away from the first gearwheel 240, the second gearwheel 260 has a bearing collar 264 which serves to rotationally mount the second gearwheel 260 in the cover opening 214 of the housing cover 212.

An output pinion 270 is arranged on that side of the housing cover 212 which faces away from the second gearwheel 260, and is connected fixedly to the output shaft 230 and the second gearwheel 260 so as to rotate with them. The output pinion 270 serves as an interface to an apparatus to be driven, in particular for a setting apparatus of a motor vehicle seat.

A geared motor 100 according to the invention having an electric motor 110 and a reduction gear unit 200 according to the invention corresponds, with the exception of details of a first gearwheel 1240 according to the invention, exactly to the above-described geared motor 100 which is known from the prior art, for which reason the description thereof also applies to the geared motor 100 with the substituted first gearwheel 1240 according to the invention and the reduction gear unit 200 with the substituted first gearwheel 1240 according to the invention, unless described differently in the following text. In addition, the geared motor 100 with the substituted first gearwheel 1240 according to the invention is assigned the same designations as the above-described geared motor 100 which is known from the prior art.

Figure 7:
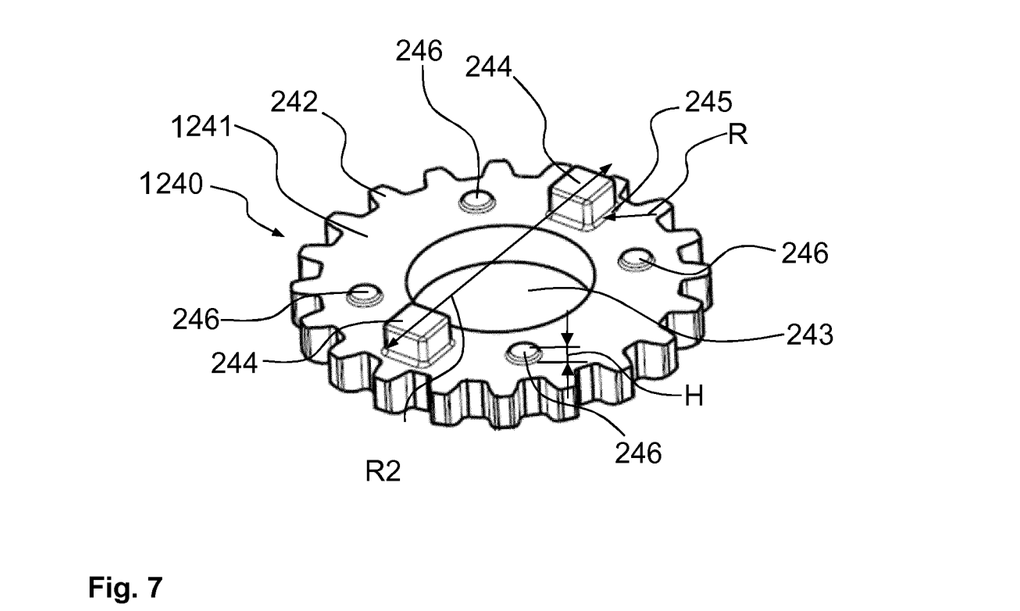
FIG. 7 is a perspective view of a first gearwheel of a second gear stage of a reduction gear unit according to the invention of a geared motor according to the invention.

FIG. 7 shows the first gearwheel 1240 according to the invention to be used instead of gearwheel 240 of the reduction gear unit 200. The gearwheel 1240 differs from the above-described gearwheel 240 in that four cams 246 project in the axial direction from a main body 1241. The cams 246 project from the main body 1241 in the same direction as two guide pins 244. All the cams 246 have an identical height H in the axial direction. Here, the height H is greater than the radius R of a transition region 245 between the main body 1241 and the respective guide pin 244. The four cams 246 are arranged such that they are distributed uniformly over the circumference of the first gearwheel 240. The four cams 246 are arranged such that they are distributed in a mirror-symmetrical manner over the circumference of the first gearwheel 1240. The four cams 246 and the two guide pins 244 are arranged such that they are distributed in a mirror-symmetrical manner.

The designations first gearwheel 1240 and second gearwheel 260 do not restrict the invention to reduction gear units 100 having only two gearwheels. In particular, the worm gear 225 of the first gear stage is also a gearwheel. In addition, a reduction gear unit according to the invention can have further gear stages.

The features which are disclosed in the above description, the claims and the drawings can be of significance both individually and in combination for the realization of the invention in its various refinements.

Although the invention has been described in detail in the drawings and the preceding description, the descriptions are to be understood to be illustrative and exemplary and not restrictive. In particular, the selection of the proportions shown in the drawing of the individual elements is not to be interpreted as required or restrictive. Furthermore, the invention is not restricted, in particular, to the above-described exemplary embodiment. Further variants of the invention and its implementation arise for a person skilled in the art from the preceding disclosure, the figures and the claims.

Terms which are used in the claims such as "comprise", "have", "contain", "include" and the like do not rule out further elements or steps. The use of the indefinite article does not rule out a plural.

While specific embodiments of the invention have been shown and described in detail to illustrate the application of the principles of the invention, it will be understood that the invention may be embodied otherwise without departing from such principles.

The invention claimed is:

1. A reduction gear unit comprising:
   a housing;
   a first gear stage; and
   a second gear stage, the second gear stage having an externally toothed first gearwheel and an internally toothed second gearwheel which meshes with the first gearwheel and is at least indirectly connected fixedly to an output so as to rotate with the output;
   a circulating eccentric which is driven by the first gear stage for driving a relative rolling movement of the second gearwheel on the first gearwheel, the first gearwheel being moved by the eccentric on a circular path; and
   a torque support disk arranged axially next to the first gearwheel and preventing the first gearwheel from performing a relative rotation with respect to the housing, the first gearwheel having at least one guide pin which engages into a guide groove of the torque support disk, or the torque support disk having at least one guide pin which engages into a guide groove of the first gearwheel, wherein the first gearwheel has at least one cam which projects in the axial direction from a main body of the first gearwheel and bears against the torque support disk in such a way that the at least one guide pin does not engage completely into the guide groove, or in that the torque support disk has at least one cam which projects in the axial direction from a main part of the torque support disk and bears against the first gearwheel in such a way that the at least one guide pin does not engage completely into the guide groove.

2. The reduction gear unit as claimed in claim 1, wherein the reduction unit forms a setting apparatus of a motor vehicle seat.

3. The reduction gear unit as claimed in claim 1, wherein the output has an output pinion.

4. The reduction gear unit as claimed in claim 1 wherein the torque support disk is guided in the housing such that the torque support disk is moveable linearly in a first direction, and the at least one guide groove is oriented in a second direction.

5. The reduction gear unit as claimed in claim 4, wherein the second direction runs oriented perpendicularly with respect to the first direction.

6. The reduction gear unit as claimed in claim 4, wherein two guide pins are arranged on a line which is congruent with the second direction, and a plurality of cams are arranged in a mirror-symmetrical manner with respect to the line.

7. The reduction gear unit as claimed in claim 1, wherein the first gearwheel has a plurality of cams, or the torque support disk has a plurality of cams.

8. The reduction gear unit as claimed in claim 7, wherein the first gearwheel has at least three cams, or the torque support disk has at least three cams.

9. The reduction gear unit as claimed in claim 8, wherein the first gearwheel has precisely four cams, or the torque support disk has precisely four cams.

10. The reduction gear unit as claimed in claim 1, wherein a plurality of cams are arranged such that the plurality of cams are distributed uniformly with respect to one another.

11. The reduction gear unit as claimed in claim 1, wherein the height of the at least one cam is greater than a radius of a rounded transition region between the at least one guide pin and the main body of the first gearwheel, or the height of the at least one cam is greater than a radius of a rounded portion of a transition region between the at least one guide pin and the main part of the torque support disk.

12. The reduction gear unit as claimed in claim 1, wherein the at least one cam is connected in one piece to the first gearwheel, or the at least one cam is connected in one piece to the torque support disk.

13. The reduction gear unit as claimed in claim 1, wherein the at least one cam is a pushed-through portion from the main body of the first gearwheel, or the at least one cam is a pushed-through portion from the main part of the torque support disk.

14. A geared motor comprising:
    an electric motor having a motor output shaft; and
    a reduction gear unit comprising:
    a housing;
    a first gear stage; and
    a second gear stage, the second gear stage having an externally toothed first gearwheel and an internally toothed second gearwheel which meshes with the first gearwheel and is at least indirectly connected fixedly to an output so as to rotate with the output;
    a circulating eccentric which is driven by the first gear stage for driving a relative rolling movement of the second gearwheel on the first gearwheel, the first gearwheel being moved by the eccentric on a circular path; and
    a torque support disk arranged axially next to the first gearwheel and preventing the first gearwheel from performing a relative rotation with respect to the housing, the first gearwheel having at least one guide pin which engages into a guide groove of the torque support disk, or the torque support disk having at least one guide pin which engages into a guide groove of the first gearwheel, wherein the first gearwheel has at least one cam which projects in the axial direction from a main body of the first gearwheel and bears against the torque support disk in such a way that the at least one guide pin does not engage completely into the guide groove, or in that the torque support disk has at least one cam which projects in the axial direction from a main part of the torque support disk and bears against the first gearwheel in such a way that the at least one guide pin does not engage completely into the guide groove, wherein the first gear stage comprises a worm, which is connected fixedly to the motor output shaft so as to rotate with the motor output shaft, and a worm gear.

15. The geared motor as claimed in claim 14, wherein the eccentric is connected fixedly to the worm gear.

16. The geared motor as claimed in claim 15, wherein the output has an output pinion.

17. The geared motor as claimed in claim 15, wherein the torque support disk is guided in the housing and is moveable linearly in a first direction, and the at least one guide groove is oriented in a second direction.

18. The geared motor as claimed in claim 17, wherein the second direction runs oriented perpendicularly with respect to the first direction.

19. The geared motor as claimed in claim 15, wherein the first gearwheel has a plurality of cams, or the torque support disk has a plurality of cams.

20. The geared motor as claimed in 15, wherein the at least one cam is formed integrally in one piece with the first gearwheel, or the at least one cam is formed integrally in one piece with the torque support disk.

\* \* \* \* \*